United States Patent
Inoue

(10) Patent No.: US 10,148,870 B2
(45) Date of Patent: Dec. 4, 2018

(54) IMAGE CAPTURING APPARATUS

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 138 days.

(21) Appl. No.: 15/210,029

(22) Filed: Jul. 14, 2016

(65) Prior Publication Data

US 2017/0034436 A1 Feb. 2, 2017

(30) Foreign Application Priority Data

Jul. 27, 2015 (JP) .................................. 2015-147699

(51) Int. Cl.
| | |
|---|---|
| *H04N 5/232* | (2006.01) |
| *H04N 5/247* | (2006.01) |
| *H04N 5/225* | (2006.01) |
| *G01B 11/14* | (2006.01) |
| *G06T 7/55* | (2017.01) |
| *H04N 5/235* | (2006.01) |
| *H04N 13/02* | (2006.01) |

(Continued)

(52) U.S. Cl.
CPC ......... *H04N 5/23229* (2013.01); *G01B 11/14* (2013.01); *G06T 7/55* (2017.01); *H04N 5/2258* (2013.01); *H04N 5/2355* (2013.01); *H04N 5/23238* (2013.01); *H04N 5/23296* (2013.01); *H04N 5/247* (2013.01); *H04N 13/0239* (2013.01); *G06T 2207/10028* (2013.01); *G06T 2207/20212* (2013.01); *H04N 5/00* (2013.01); *H04N 5/23245* (2013.01); *H04N 7/18* (2013.01); *H04N 2013/0081* (2013.01)

(58) Field of Classification Search
CPC ... H04N 5/00; H04N 7/18; G06T 7/00; G01B 11/00
See application file for complete search history.

(56) References Cited

U.S. PATENT DOCUMENTS

| | | | |
|---|---|---|---|
| 8,780,200 B2 | 7/2014 | Yamamoto | |
| 2012/0293633 A1* | 11/2012 | Yamato | G01C 11/06 348/47 |

(Continued)

FOREIGN PATENT DOCUMENTS

| | | |
|---|---|---|
| JP | 2012049651 A | 3/2012 |
| JP | 2013061560 A | 4/2013 |

*Primary Examiner* — Maryam A Nasri
(74) *Attorney, Agent, or Firm* — Rossi, Kimms & McDowell LLP

(57) ABSTRACT

An image capturing apparatus includes a main image capturing system configured to capture an object image formed by a main optical system that can vary a magnification, a first sub capturing system configured to capture an object image formed by a first sub optical system having an angle of view equal to or wider than that at a wide-angle end of the main optical system, and a second sub capturing system configured to capture an object image formed by a second sub optical system having an angle of view narrower than that at a wide-angle end and equal to or wider than that at a telephoto end of the main optical system. An optical barrel configured to hold the main optical system can be retracted relative to a body of the image capturing apparatus. A predetermined condition is satisfied.

8 Claims, 10 Drawing Sheets

(51) Int. Cl.
    *H04N 7/18*     (2006.01)
    *H04N 5/00*     (2011.01)
    *H04N 13/00*    (2018.01)

(56) References Cited

U.S. PATENT DOCUMENTS

2016/0381289 A1* 12/2016 Kim .................... H04N 5/23222
                                                                                         348/38
2017/0223261 A1* 8/2017 Shimizu ............. H04N 5/23212

\* cited by examiner

ILLUSTRATIVE IMAGE THAT DOES NOT SATISFY CONDITIONAL EXPRESSIONS

ILLUSTRATIVE IMAGE THAT DOES NOT SATISFY CONDITIONAL EXPRESSIONS

IMAGE CAPTURING APPARATUS

BACKGROUND OF THE INVENTION

Field of the Invention

The present invention relates to an image capturing apparatus that includes a main image capturing system and a sub image capturing system.

Description of the Related Art

One proposed image capturing apparatus, such as a video camera and a digital camera, includes a sub image capturing system in addition to a main image capturing system configured to acquire a usual image.

Japanese Patent Laid-Open No. ("JP") 2012-49651 discloses an image capturing apparatus that includes a main image capturing system that includes a zoom lens, and a sub image capturing system that includes a fixed focal length lens of a wide angle of view. This image capturing apparatus enables a moving object to be easily followed, because the sub image capturing system acquires an image with an angle of view wider than that of the main image capturing system. JP 2012-49651 discloses an acquisition of information of an object distance using the image acquired by the main image capturing system and the image acquired by the sub image capturing system.

JP 2013-61560 discloses an image capturing apparatus that includes a main image capturing system that has a zoom lens, and a sub image capturing system as a plurality of stereo cameras having focal lengths that are different from one another. This image capturing apparatus acquires object distance information based on parallax information obtained by the stereo cameras, and provides an autofocus ("AF") control over the main image capturing system using the object distance information.

For a small image capturing apparatus with a high zoom ratio, a so-called retractable lens barrel is known which is retracted into a body of an image capturing apparatus in a non-image-capturing state and extended from the body in the image capturing state. The retractable lens barrel is applicable to the zoom lens of the main image capturing system in each of the image capturing apparatuses disclosed in JPs 2012-49651 and 2013-61560.

However, when the retractable lens barrel of the main image capturing system is close to a lens in the sub image capturing system, the angle of view of the sub image capturing system is shielded by the extended lens barrel. A shield of the angle of view of the sub image capturing system by the lens barrel can be prevented by increasing the distance between the lens in the sub image capturing system and the lens barrel of the main image capturing system, but this configuration causes the image capturing apparatus to become large.

In addition, the image capturing apparatus disclosed in JP 2013-61560 includes the sub image capturing system having an angle of view close to that at the telephoto end of the main image capturing system, and the sub image capturing system is significantly distant from the main image capturing system. Therefore, in capturing a short-distance object, an angle-of-view range that can be commonly captured by the main and sub image capturing systems reduces and an object distance range becomes narrow from which the object distance information can be acquired. This problem becomes remarkable as a zoom ratio of the zoom lens in the main image capturing system becomes wider.

Each of JPs 2012-49651 and 2013-61560 does not consider a disposition condition of the sub image capturing system when the retractable lens barrel is used for the main image capturing system.

SUMMARY OF THE INVENTION

The present invention provides a small image capturing apparatus that includes a main image capturing system having a high zoom ratio and enables object distance information to be precisely acquired in a wide object distance range using the main image capturing system and a sub image capturing system.

An image capturing apparatus according to one aspect of the present invention includes a main image capturing system configured to capture an object image formed by a main optical system that can vary a magnification, a first sub capturing system configured to capture an object image formed by a first sub optical system having an angle of view equal to or wider than that at a wide-angle end of the main optical system, and a second sub capturing system configured to capture an object image formed by a second sub optical system having an angle of view narrower than that at the wide-angle end of the main optical system and equal to or wider than that at a telephoto end of the main optical system. An optical barrel configured to hold the main optical system is retractable relative to a body of the image capturing apparatus, and the first sub optical system and the second sub optical system are provided to the body. Where an i-th denotes first or second, and an i-th inter-axis direction is a direction in which an optical axis of the main optical system is separated from one of an optical axis of the first sub optical system and an optical axis of the second sub optical system. The following conditions are satisfied.

$$20 \geq \frac{L_{ij}}{M_j \tan \omega_1} \geq 1$$

$$30 \geq \frac{N}{f_t \tan \Omega_t}$$

Herein, $\Omega_t$ is a half angle of view in a second inter-axis direction at the telephoto end of the main optical system, $f_t$ is a focal length at the telephoto end of the main optical system, N is an inter-axis distance between the main optical system and the second sub optical system, and $\omega_i$ is a half angle of view in the i-th inter-axis direction of the i-th sub optical system among the first sub optical system and the second sub optical system, $L_{ij}$ is a distance between the optical axis of the i-th sub optical system and an outer circumferential surface of a j-th barrel segment from the body in the optical barrel in the i-th inter-axis direction, and $M_j$ is an extension amount of the j-th barrel segment relative to an optical surface closest to an object side in the first sub optical system and the second sub optical system.

Further features of the present invention will become apparent from the following description of exemplary embodiments with reference to the attached drawings.

DESCRIPTION OF THE EMBODIMENTS

Referring now to the accompanying drawings, a description will be given of each embodiment according to the present invention.

Prior to a description of a concrete embodiment, a description will now be given of a common subject matter to each embodiment. An image capturing apparatus according to each embodiment includes a main image capturing system configured to capture an object image formed by a main optical system configured to vary a magnification, and first and second sub image capturing systems each configured to capture an object image formed by a corresponding one of first and second sub optical systems. The first sub optical system has an angle of view equal to or wider than that at the wide-angle end of the main optical system. The second sub optical system has an angle of view narrower than that at the wide-angle end of the main optical system and equal to or wider than that at the telephoto end of the main optical system. A main image is obtained as a (captured) image from the main image capturing system, and a sub image is obtained as a (captured) image from each of the first and second sub image capturing system. Object distance information is obtained and a combined image is generated by using the main image and the sub images.

Figure 17:
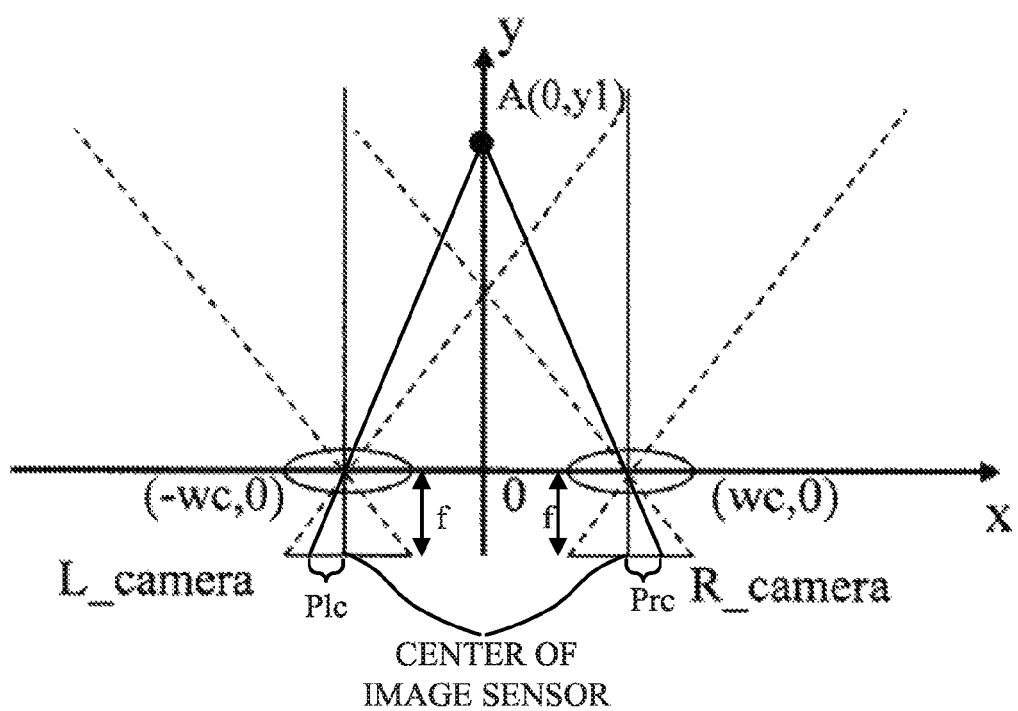
FIG. 17 illustrates a model of two-viewpoint image capturing method.

The object distance information is obtained using parallax images generated by the main image capturing system and the first and second sub image capturing systems having viewpoint positions different from one another. Referring to FIG. 17, a description will be given of a calculation principle of an object distance using the parallax images. FIG. 17 illustrates a model of two-viewpoint image capturing method. An origin of a coordinate is set at the center between left and right cameras L_camera and R_camera, a horizontal direction is set to an x-axis and a depth direction is set to a y-axis. A height direction is omitted.

Principal points of imaging optical systems in the left and right cameras L_camera and R_camera are set to (−Wc, 0) and (Wc, 0), respectively, and f is set to a focal length of the imaging optical system in each camera. An object A located at the coordinate (0, y1) on the y-axis is captured by the left and right cameras L_camera and R_camera. The following expressions (11) and (12) represent shift amounts (parallaxes) Plc and Prc from the optical image of the object A (object image) to the centers of image sensors (image capturing devices) in the left and right cameras L_camera and R_camera.

$$Plc = -\frac{wc}{y1} \cdot f \quad (11)$$

$$Prc = -\frac{wc}{y1} \cdot f \quad (12)$$

In other words, left and right parallax images having shift amounts (parallax amounts) Plc and Prc expressed by the expressions (11) and (12) in the viewpoint shift direction (baseline direction) can be obtained by capturing the same object from different viewpoint positions. The distance y1 to the object A can be calculated based on the shift amounts Plc and Prc using the following expression (13).

$$y1 = -\frac{2wc}{Prc - Plc} \cdot f \quad (13)$$

In order to calculate the object distance using the parallax images, it is necessary to specify corresponding object areas between the parallax images. A corresponding point extracting method, such as a block matching method, which will be described later, can be used for a method for specifying corresponding object areas between two images.

Next follows a description of a problematic case where corresponding object areas between the parallax images cannot be specified, which may occur when an optical system (zoom lens) configured to vary a magnification in a main image capturing system is held in a retractable lens barrel in the image capturing apparatus of each embodiment.

The retractable lens barrel is extended to the object side relative to a front surface of the image capturing apparatus (surface on the object side) in the image capturing state. Thus, when this retractable lens barrel is used for the main image capturing system and the sub image capturing system is disposed near the lens barrel, the angle of view of the sub image capturing system is shielded by the extended lens barrel, and the sub image obtained by the sub image capturing system is cut. As a result, an object in a main image obtained by the main image capturing system may not appear in a sub image. When the sub image capturing system is disposed at a position significantly distant from the lens barrel of the main image capturing system so as to eliminate a shield of the angle of view by the lens barrel, the image capturing apparatus becomes large and a shift amount (parallax amount) between the parallax images becomes excessively large because the base length between the main and sub image capturing systems becomes too long.

In particular, when the base length is excessively long between the main and sub image capturing systems in capturing a short-distance object, an angle-of-view range that can be commonly captured by them (referred to as a "commonly captured angle-of-view range" hereinafter) reduces and part of the object contained in the main image does not included in the sub image. When the same object is not contained in both parallax images, the corresponding object areas between the parallax images cannot be specified and the object distance cannot be calculated.

Accordingly, each embodiment arranges the first and second sub optical systems on the front surface of the image capturing apparatus, and the lens barrel as the optical barrel configured to hold the main optical system is extendable relative to the body (front surface) of the image capturing apparatus.

A direction in which the optical axes of the first and second sub optical systems are separated from the optical axis of the main optical system will be referred to as an i-th inter-axis direction where "i-th" means first or second. $\Omega_t$ is a half angle of view in the second inter-axis direction at the telephoto end of the main optical system, $f_t$ is a focal length at the telephoto end of the main optical system, N is an inter-axis distance between the main optical system and the second sub optical system, and $\omega_i$ is a half angle of view in the i-th inter-axis direction of the i-th sub optical system among the first and second sub optical systems. $L_{ij}$ is a distance between the optical axis of the i-th sub optical system and an outer circumferential surface of a j-th barrel segment from the body side in the optical barrel in the i-th inter-axis direction, and $M_j$ is an extension amount of the j-th barrel segment relative to the optical surface closest to an object side in the first and second sub optical systems. Then, the image capturing apparatus according to each embodiment satisfies conditions expressed by the following expressions.

$$20 \geq \frac{L_{ij}}{M_j \tan \omega_1} \geq 1 \qquad (1)$$

$$30 \geq \frac{N}{f_t \tan \Omega_t} \qquad (2)$$

The condition of the conditional expression (1) is a condition among an extension amount of the lens barrel configured to hold the main optical system that can vary the magnification, positions of the first and second sub optical systems, and the angles of view of the first and second sub optical systems. When this condition is satisfied, the image capturing angle of view of the sub image capturing system is prevented from being shielded by the lens barrel of the main image capturing system, and the image capturing apparatus is prevented from being large. The condition of the conditional expression (2) is a condition among a half angle of view at the telephoto end of the main optical system, a focal length of the main optical system, and an inter-axis distance between the main optical system and the second sub image capturing system. When this condition is satisfied, an angle-of-view range that can be commonly captured by the main image capturing system and the second sub image capturing system can be maintained sufficiently wide in capturing the short-distance object. Hence, by satisfying both conditions of the conditional expressions (1) and (2), the image capturing apparatus that includes the main image capturing system and the first and second sub image capturing systems can be made small and object distance information can be precisely obtained in a wide object distance range.

When the value of the conditional expression (1) is lower than the lower limit value, the image capturing angle of view in the sub image capturing system is shielded by the lens barrel of the main image capturing system, and part of the object contained in the main image does not appear in the sub image. Hence, the main image disadvantageously contains an area in which object distance information cannot be obtained. On the other hand, when the value of the conditional expression (1) is higher than the upper limit value, the image capturing angle of view in the sub image capturing system is not shielded by the lens barrel of the main image capturing system, but the image capturing apparatus becomes large because it is necessary to dispose the sub optical system distant from the main optical system.

When the value of the conditional expression (2) is larger than the upper limit value, a common object area significantly reduces between the main image obtained by the main image capturing system and the sub image obtained by the second sub image capturing system, and an area in the main image becomes disadvantageously wide in which the object distance information cannot be obtained.

The numerical ranges of the conditional expressions (1) and (2) may be modified as follows:

$$15 \geq \frac{L_{ij}}{M_j \tan \omega_1} \geq 1 \qquad (1a)$$

$$20 \geq \frac{N}{f_t \tan \Omega_t} \qquad (2a)$$

The numerical ranges of the conditional expressions (1) and (2) may be further modified as follows:

$$10 \geq \frac{L_{ij}}{M_j \tan \omega_1} \geq 1 \qquad (1b)$$

$$10 \geq \frac{N}{f_t \tan \Omega_t} \qquad (2b)$$

A description will now be given of concrete embodiments.

First Embodiment

Figure 1:
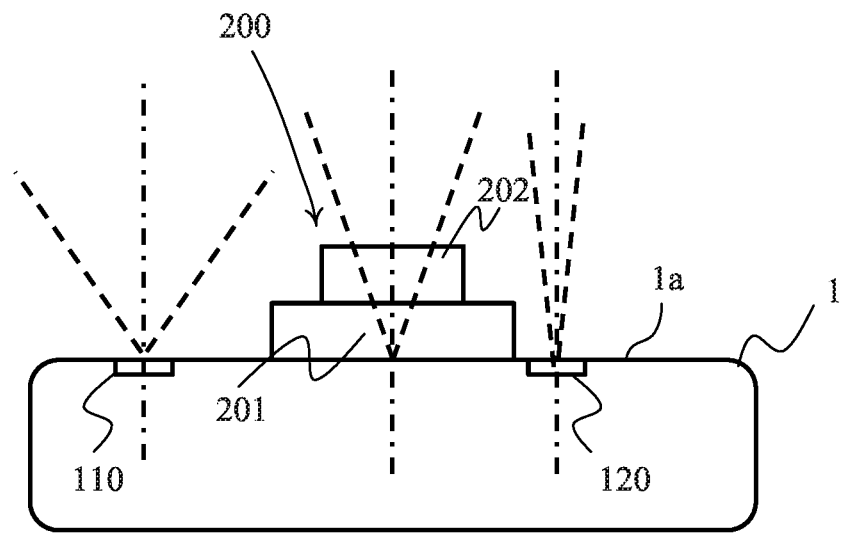
FIG. 1 is a bottom view of an image capturing apparatus according to a first embodiment of the present invention.
Figure 2:
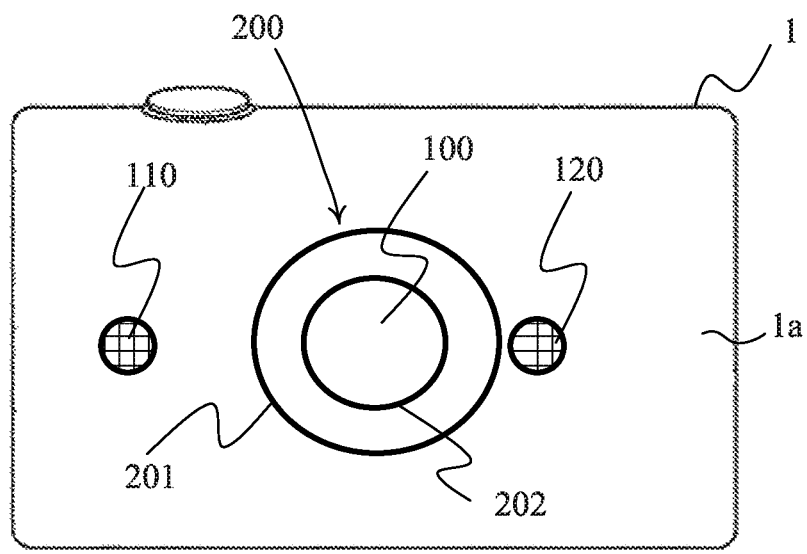
FIG. 2 is a front view of the image capturing apparatus according to the first embodiment.

FIG. 1 illustrates a bottom view of an image capturing apparatus 1 according to a first embodiment of the present invention. FIG. 1 illustrates the image capturing apparatus 1 when the lens barrel is extended. FIG. 2 illustrates the image capturing apparatus 1 according to this embodiment viewed from the object side. A two-stage retractable lens barrel 200 is retractable and extendable relative to a body (housing) 1a of the image capturing apparatus 1, configured to hold a main object 100, and provided at the center of a front surface that is a surface on the object side of the body 1a. A first sub optical system 110 and a second sub optical system 120 are arranged on the front surface of the body 1a in the horizontal direction at both sides of the lens barrel 200.

The main optical system 100 is an imaging optical system having a variable focal length from 24 mm to 300 mm in the 35 mm conversion. An unillustrated main image sensor, such as a CCD sensor or a CMOS sensor, has a rectangular image capturing region (photoelectric conversion area) corresponding to the main optical system 100, and captures or photoelectrically converts an object image formed by the main optical system 100. The image capturing region of the main image sensor has an aspect ratio of 4:3 and a diagonal length of 7.75 mm. The main optical system 100 and the main image sensor constitute the main image capturing system.

The extended lens barrel 200 includes, in order from the body side (front surface side), a first barrel segment 201 and a second barrel segment 202. An outer diameter of the second barrel segment 202 is smaller than that of the first barrel segment 201.

Each of the first and second sub optical systems 110 and 120 is a (fixed focal length) imaging optical system having a fixed focal length. Two unillustrated sub image sensors, such as a CCD sensor or a CMOS sensor, have rectangular image capturing regions corresponding to the first and second sub optical systems 110 and 120, and capture or photoelectrically convert object images formed by each of the first and second sub optical systems 110 and 120. The image capturing region of each sub image sensor has an aspect ratio of 4:3, and a diagonal length shorter than that of the image capturing region of the main image sensor. The first sub optical system 110 and the corresponding sub image sensor constitute the first sub image capturing system, and the second sub optical system 120 and the corresponding sub image sensor constitute the second sub image capturing system.

The main optical system 100 and the first and second sub optical systems 110 and 120 are arranged so that their optical axes are parallel to one another. The first sub optical system 110 is a fixed focal length optical system having the same focal length (or the same angle of view) as that of 24 mm at the wide-angle end of the main optical system 100 in the 35 mm conversion. On the other hand, the second sub optical system 120 is a fixed focal length optical system having a focal length at a middle zoom position between the wide-angle end and the telephoto end of the main optical system 100 (or an angle of view narrower than that at the wide-angle end and wider than that at the telephoto end of the main optical system 100). In one example, the second sub optical system 120 has a focal length of 150 mm in the 35 mm conversion.

Figure 4:
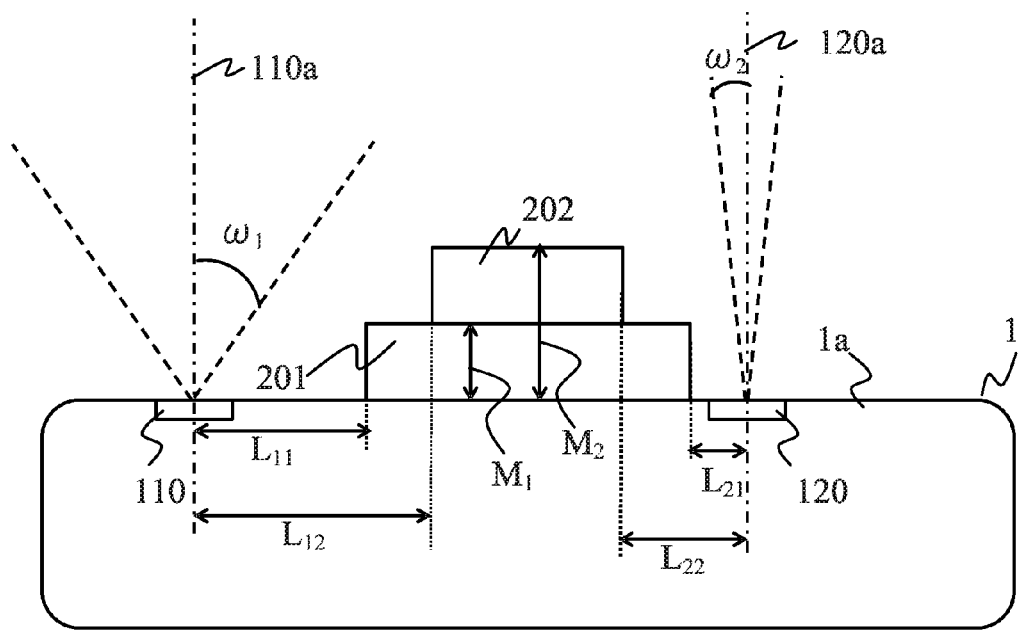
FIG. 4 is a view for explaining a relationship between the first embodiment and a conditional expression (1).
Figure 5:
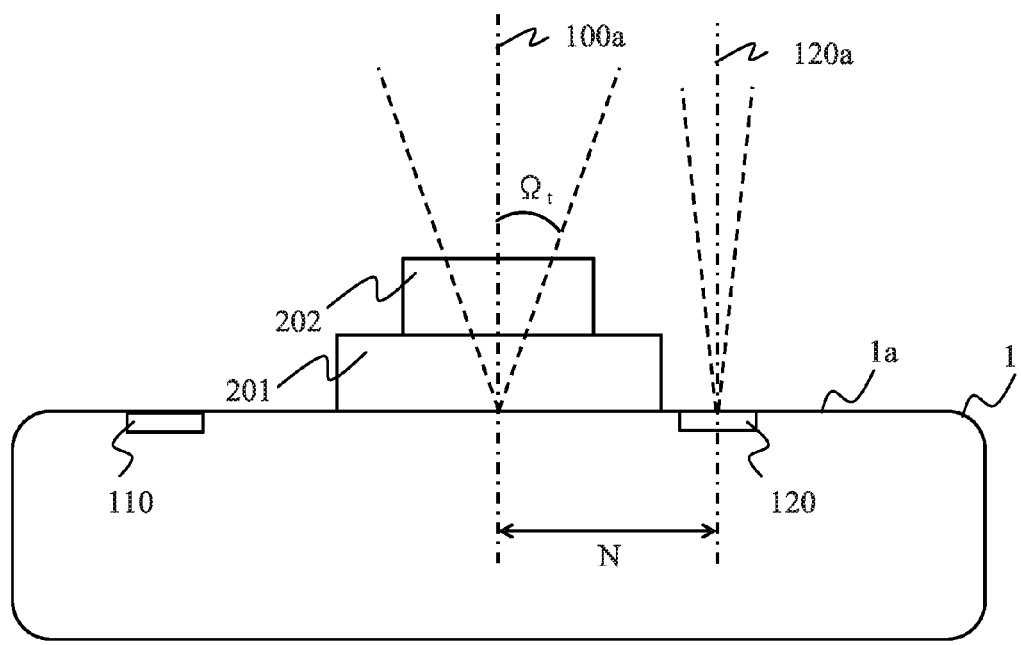
FIG. 5 is a view for explaining a relationship between the first embodiment and a conditional expression (2).

Referring now to FIGS. 4 and 5, a description will be given of a relationship between the configuration of the image capturing apparatus 1 according to this embodiment and the conditions of the conditional expressions (1) and (2). FIG. 4 illustrates definitions relating to the condition of the conditional expression (1). Illustrated $M_1$ is an extension amount of the front end surface (or upper end surface) of the first barrel segment 201 from the optical surfaces (referred to as "front end lens surfaces" hereinafter) closest to the object of the first and second sub optical systems 110 and 120. In other words, it is a distance from the front end lens surface to the front end surface of the first barrel segment 201 in the optical axis direction. In this embodiment, $M_1$=10 mm. $M_2$ is an extension amount of the front end surface of the second barrel segment 202 from the front end lens surfaces of the first and second sub optical systems 110 and 120. In this embodiment, $M_2$=20 mm.

The positions of the front end lens surfaces of the actual first and second sub optical systems 110 and 120 in the optical axis direction can be different from each other. In that case, a larger one of $M_1$ and $M_2$ or a smaller one of $M_1$ and $M_2$ may be selected. Instead of the front lens surfaces of the first and second sub optical systems 110 and 120, the front surface of the body 1a located at approximately the same position may be used as a reference. This is applied to other embodiments, which will be described later.

$L_{11}$ is a distance in the horizontal direction (first inter-axis direction) between the optical axis 110a of the first sub optical system 110 and the outer circumferential surface of the first barrel segment 201. In this embodiment, $L_{11}$=22.7 mm. $L_{12}$ is a distance in the horizontal direction between the optical axis 110a of the first sub optical system 110 and the outer circumferential surface of the second barrel segment 202. In this embodiment, $L_{12}$=31.2 mm. $L_{21}$ is a distance in the horizontal direction (second inter-axis direction) between the optical axis 120a of the second sub optical system 120 and the outer circumferential surface of the first barrel segment 201. In this embodiment, $L_{21}$=7.8 mm. $L_{22}$ is a distance in the horizontal direction between the optical axis 120a of the second sub optical system 120 and the outer circumferential surface of the second barrel segment 202. In this embodiment, $L_{22}$=16.9 mm.

$\omega_1$ is a half angle of view of the first sub optical system 110 in the horizontal direction (or first inter-axis direction). More specifically, $\omega_1$ is a half value of an angle of view determined by a length of a long side of the rectangular image capturing region of the sub image sensor corresponding to the first sub optical system 110. In this embodiment, $\omega_1$=35.8°. $\omega_2$ is a half angle of view of the second sub optical system 120 in the horizontal direction (or second inter-axis direction). More specifically, $\omega_2$ is a half value of an angle of view determined by a length of a long side of the rectangular image capturing region of the sub image sensor corresponding to the second sub optical system 120. In this embodiment, $\omega_2$=6.6°.

FIG. 5 illustrates definitions relating to the condition of the conditional expression (2). Illustrated $\Omega_t$ is a half angle of view of the main optical system 100 at the telephoto end in the horizontal direction (second inter-axis direction). In this embodiment, $\Omega_t$=4.12°. A focal length of the main optical system 100 at the telephoto end is $f_t$=53.7 mm. N is an inter-axis distance between the main optical system 100 and the second sub optical system 120 or a distance between the optical axes 100a and 120a. In this embodiment, N=28.6 mm.

Table 1 summarizes the above values of this embodiment. Table 2 summarizes the values of the conditional expressions (1) and (2) in this embodiment. As understood from Table 2, this embodiment satisfies the conditions of the conditional expressions (1) and (2). When the conditions of the conditional expressions (1) and (2) are satisfied, the image capturing apparatus 1 can be made small and the object distance information can be precisely obtained in a wide object distance range.

In this embodiment, the first inter-axis direction in which the optical axis 100a of the main optical system 100 and the optical axis 110a of the first sub optical system 110 separate from each other is the same as the second inter-axis direction in which the optical axis 100a of the main optical system 100 and the optical axis 120a of the second sub optical system 120 separate from each other. However, the first inter-axis direction may not be always equal to or may be different from the second inter-axis direction.

Figure 6A:
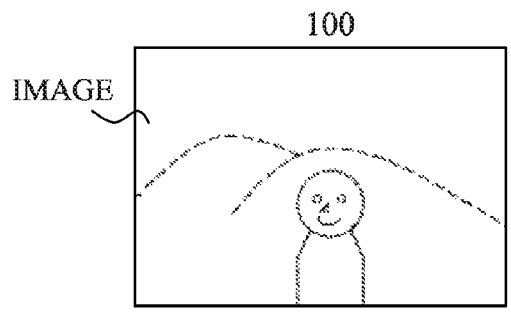
FIGS. 6A-6C are views for explaining images captured at a wide-angle state according to the first embodiment.
Figure 6B:
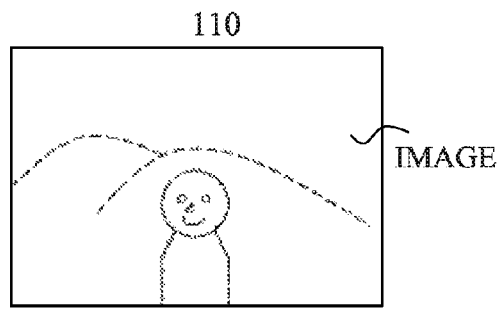

Referring now to FIGS. 6A to 6C and 7A to 7C, a description will be given of an image obtained by the image capturing apparatus 1 in this embodiment. FIG. 6A illustrates an example of a main image generated by the main image capturing system 100 when the main optical system 100 is set to the wide-angle end. FIG. 6B illustrates an example of a sub image generated by the first sub image capturing system when the main optical system 100 is set to the wide-angle end. As illustrated in FIGS. 6A and 6B, the main image and sub image obtained by the main image capturing system and the first sub image capturing system contain the same objects that slightly shift in the base or baseline direction (first inter-axis direction). When the conditional expression (1) is satisfied, the angle of view in the sub image obtained by the first sub image capturing system is not shielded by the lens barrel 200 of the main image capturing system.

Figure 6C:
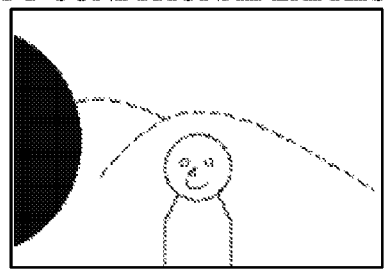

FIG. 6C illustrates an example of a sub image obtained by the first sub image capturing system in the image capturing apparatus that has a value lower than the lower limit value of the conditional expression (1). A large left black area in the sub image illustrated in FIG. 6C is an area corresponding to an angle of view shielded by the lens barrel 200 of the main image capturing system. The object at the left edge (part of the mountain) in the main image illustrated in FIG. 6A is not contained in the sub image of FIG. 6C. Hence, the object distance information cannot be obtained for the object at the left edge in the main image.

Figure 7A:
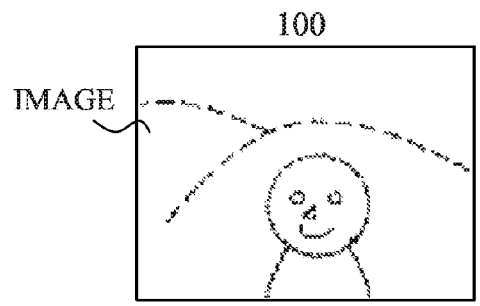
FIGS. 7A-7C are views for explaining images captured at a telephoto state according to the first embodiment.
Figure 7B:
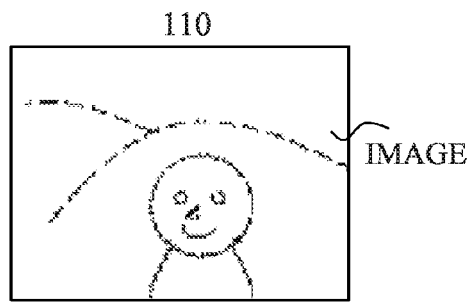

FIG. 7A illustrates an example of the main image obtained when the main optical system 100 is set to a focal length of 150 mm in the 35 mm conversion. FIG. 7B illustrates an example of the sub image obtained by the second sub image capturing system when the main optical system 100 is set to the wide-angle end. As illustrated in FIGS. 7A and 7B, the main and sub images obtained by the main and second sub image capturing systems contain the same objects that slightly shift in the base direction (second inter-axis direction). When the condition of the expression (2) is satisfied, the sub image obtained by the second sub image capturing system can secure a wide commonly captured angle-of-view range to that of the main image capturing system.

Figure 7C:
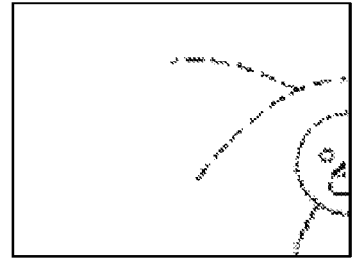

FIG. 7C illustrates an example of the sub image obtained by the second sub image capturing system in the image capturing apparatus that has a value higher than the upper limit value of the conditional expression (2). The object in the sub image illustrated in FIG. 7C significantly shifts to the right side from that in the main image illustrated in FIG. 7A, and the commonly captured angle-of-view range to that of the main capturing system becomes half or less. Since the right half in the object contained in FIG. 7A is not contained in the sub image illustrated in FIG. 7C, the object distance information of this part cannot be obtained.

Figure 3:
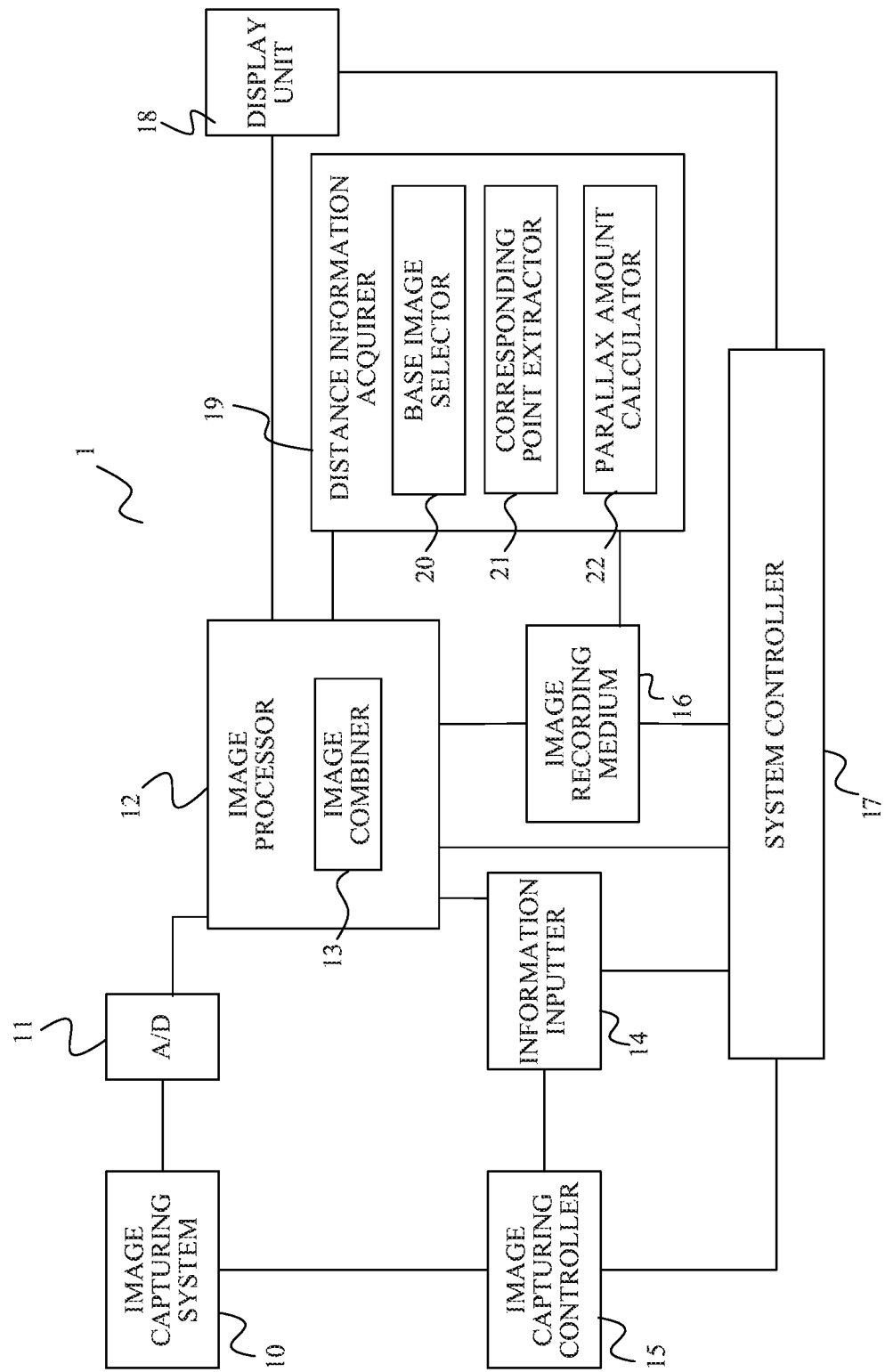
FIG. 3 is a block diagram of an electric configuration of the image capturing apparatus according to the first embodiment.

FIG. 3 illustrates an electric configuration of the image capturing apparatus 1 according to this embodiment. The image capturing apparatus 1 includes an image capturing system 10 that includes a main image capturing system and first and second sub image capturing systems, an A/D converter 11, an image processor 12, and an image combiner 13. The image capturing apparatus 1 further includes an information inputter 14, an image capturing controller 15, an image recording medium 16, a system controller 17, a display unit 18, and a distance information acquirer (distance acquirer) 19.

The A/D converter 11 converts analog image signals output from the main image sensor and two sub image sensors into digital image signals and supplies the digital image signals to the image processor 12. The image processor 12 performs a pixel interpolation process, a color conversion process, and a digital zoom process for the digital image signals from the A/D converter 11, and generates images (including a main image and two sub images). The image processor 12 performs a variety of calculation processes using the images and sends the calculation results to the system controller 17.

The image processor 12 further includes an image combiner 13. The image combiner 13 sets the main image obtained by the main image capturing system that provides a base viewpoint to a base image to be combined, and combines at least one of the sub images obtained by the two sub image capturing systems with the base image. The image combination can use a block matching method, etc., which will be described later.

The information inputter 14 detects information of a desired image capturing condition, such as an F-number and an exposure time period, selected and input by a user, and supplies the data of the information to the system controller 17. The image capturing controller 15 moves the focus lens included in each optical system and controls an F-number of each optical system and the exposure time period of the image sensor of each image capturing system, in accordance with a command from the system controller 17.

The image recording medium 16 stores the image generated by the image processor 12, and records a file header for an image file that stores the image. The display unit 18 displays a preview image in the image capturing, a recorded image, and selectable menu items, a focal distance range (angle-of-view range), etc. The display unit 18 includes a liquid crystal display, etc.

The distance information acquirer 19 includes a base image selector 20, a corresponding point extractor 21, and a parallax amount calculator 22. The base image selector 20 selects the main image obtained by the main image capturing system as a base image used to obtain the distance information. The corresponding point extractor 21 extracts corresponding pixels (referred to as "corresponding points" hereinafter) in a pair of parallax images among the main image and the plurality of sub images. The parallax amount calculator 22 calculates parallax amounts of all corresponding points extracted by the corresponding point extractor 21. The distance information acquirer 19 calculates an object distance (or acquires the object distance information) in the entire area of the main image (or in the image capturing angle of view of the main image capturing system) based on the calculated parallax amount.

Referring now to a flowchart illustrated in FIG. 8, a description will be given of an image capturing/image combining process performed by the system controller 17 and the image processor 12 (image combiner 13) according to this embodiment. Each of the system controller 17 and the image processor 12 includes a computer and executes the image capturing/image combining process in accordance with an image capturing/image combining process program as a computer program. "S" stands for the step.

Initially, in S100, the system controller 17 obtains information, such as an image capturing condition input by a user through the information inputter 14. When an image capturing command signal is input from an unillustrated image capturing start switch operated by the user, information, such as the image capturing condition, is transferred to the image capturing controller 15. The image capturing condition includes an image capturing angle of view, an F-number, a shutter speed, etc. The image capturing controller 15 controls the image capturing angle of view of the main image capturing system (zoom state), the F-number, the shutter speed, etc. of the main and sub image capturing systems, based on the input image capturing condition.

Next, in S101, the system controller 17 selects the first and second sub image capturing systems used for image capturing in the first and second sub image capturing systems, in accordance with the input image capturing condition. In selecting the sub image capturing system, the information of the image capturing angle of view set to the main image capturing system (referred to as a "main image capturing angle of view" hereinafter). Herein, in order to combine the entire main image obtained by the main image capturing system, the sub image capturing system is selected which has an image capturing angle of view equal to or wider than the set angle of view of the main image capturing system (referred to as a "sub image capturing angle of view" hereinafter).

Next, in S102, the system controller 17 instructs the image capturing controller 15 to provide image capturing with the main image capturing system and the first or second sub image capturing system selected in S101 (exposures with the main and sub image sensors), and makes the image processor 12 generate an image. Thereby, one main image and the two sub images are obtained as parallax images mutually having parallaxes. In this case, the image processor 12 corrects the luminance level and white balance of each image, and thereby reduces the uneven luminance and uneven color in the combined image generated by the subsequent image combination.

Next, in S103, the system controller 17 determines whether the main image capturing angle of view is equal to the sub image capturing angle of view of the selected sub image capturing system. When the main image capturing angle of view is equal to the sub image capturing angle of view, the system controller 17 moves to S104, and when the main image capturing angle of view is different from the sub image capturing angle of view, the system controller 17 moves to S105.

In S104, the system controller 17 makes the image processor 12 combine the sub image having the same image capturing angle of view as that of the main image, with the main image as the base image for the combination.

A description will be given of a combination method of the main and sub images by the image processor 12. As a representative example, a description will be given of a case where the image capturing angle of view of the main image capturing system is set to the wide-angle end. This embodiment sets the main image (FIG. 6A) to the base image, and the object area corresponding to that in the base image is extracted from the sub image obtained by the first sub image capturing system (first sub optical system 110) and combined.

Figure 9:
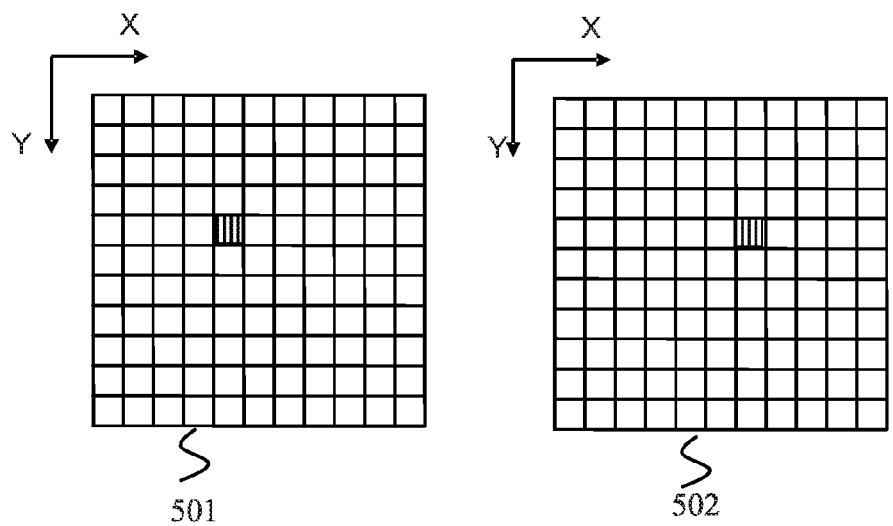
FIG. 9 is a view for explaining a corresponding area extracting method

A description will now be given of an extraction method of an object area from the sub image (reference image) corresponding to an object area in the main image (base image). FIG. 9 illustrates a base image 501 as a main image illustrated in FIG. 6A on the left side, and a reference image 502 as a sub image (obtained through the first sub optical system 110) illustrated in FIG. 6B to be combined with the base image 501. Herein, an image coordinate (X, Y) that designates a position in the horizontal and vertical directions on the image. The image coordinate (X, Y) defines an upper left corner of each image illustrated in FIG. 9 as an origin. F1(X, Y) denotes a luminance of the image coordinate (X, Y) in the base image 501, and F2(X, Y) denotes a luminance of the image coordinate (X, Y) in the reference image 502.

A hatched pixel in the reference image 502 corresponding to a hatched pixel at an arbitrary coordinate (X, Y) in the base image 501 can be obtained by finding a pixel having a luminance most similar to the luminance F1(X, Y) in the base image 501 in the reference image 501. Since it is difficult to simply find a pixel having a luminance most similar to that at the arbitrary pixel, a pixel having a similar luminance is found by a block matching method that uses pixels near the image coordinates (X, Y).

For example, a description will be given of the block matching process when the block size is 3. The luminance values of totally three pixels that include a pixel at an arbitrary coordinate (X, Y) in the base image 501 and two pixels at coordinates (X−1, Y) and (X+1, Y) or at both sides of it are expressed as follows:

$$F1(X,Y), F1(X-1,Y) \text{ and } F1(X+1,Y).$$

On the other hand, the luminance values of three pixels in the reference image 502 that shift from (X, Y), (X−1, Y) and (X+1, Y) by k in the X direction are expressed as follows:

$$F2(X+k,Y), F2(X+k-1,Y) \text{ and } F2(X+k+1,Y).$$

At this time, the similarity E with the pixel at the coordinate (X, Y) in the base image 501 is defined as follows:

$$E = [F1(X, Y) - F2(X + k, Y)] + \\ [F1(X - 1, Y) - F2(X + k - 1, Y)] + \\ [F1(X + 1, Y) - F2(X + k + 1, Y)] = \\ \sum_{j=-1}^{1} [F1(X + j, Y) - F2(X + k + j, Y)] \quad (14)$$

In the expression (14), a value of the similarity E is calculated by sequentially changing a value of k, and (X+k, Y) that provides the least similarity E is a pixel (corresponding point) in the reference image 502 corresponding to the coordinate (X, Y) in the base image 501. While the corresponding point extracting method has been described between images having parallaxes in the horizontal direction, the corresponding points can be extracted between images having parallaxes in the vertical or oblique direction.

A noise level can be reduced in the base image and the image quality of the output combined image can be improved by combining the object area as the thus obtained corresponding point with the base image for each pixel unit.

When the shapes of the object areas are different between the base image and the reference image because the parallaxes are too large for the block matching method, a geometric conversion, such as the affine transformation, may be performed for the reference image and then the combination process may be performed with the block matching method.

When the sub image capturing angle of view is different from the main image angle of view, the system controller 17 moves from S103 to S105, makes the image processor 12 perform trimming and enlargement processes so that part of the image area of the sub image (reference image) can be an image corresponding to the main image capturing angle of view. Herein, the main image capturing angle of view is an angle of view corresponding to 50 mm in the 35 mm conversion.

Next, in S106, the system controller 17 makes the image processor 12 combine the enlarged image obtained by the trimming and the enlargement process in S105, with the main image (reference image).

A description will be given of a combination method of the reference image having an image capturing angle of view different from that of the base image, with the base image. In the reference image (sub image) obtained at an image capturing angle of view wider than that of the base image (main image), the size of the object on the image is different from that of the base image. Therefore, in S105, the area that contains the object in the sub image is trimmed and enlarged so as to produce an enlarged image in which the area can be an image corresponding to the same image capturing angle of view with that of the main image capturing angle of view. Due to the trimming and enlargement processes, the resolution of the enlarged image is lower than that of the original sub image, but the size of the object on the enlarged image can be equal to that of the main image. Thereafter, similar to S104, the enlarged image is combined as a new reference image with the base image so as to generate a combined image.

When the combined image is generated in S104 or S106, the system controller 17 stores the combined image in the image recording medium 16 in S107. Then, the system controller 17 ends the procedure.

Referring now to a flowchart illustrated in FIG. 10, a description will be given of the image capturing/object distance calculation process performed by the system controller 17 and the distance information calculator 19. Initially, a description will be given of a process using parallax images obtained by the main image capturing system and the second sub image capturing system. Each of the system controller 17 and the object distance calculator 19 includes a computer, and executes the image capturing/object distance calculating process in accordance with an image capturing/object distance calculating process program as a computer program. "S" stands for the step.

Figure 8:
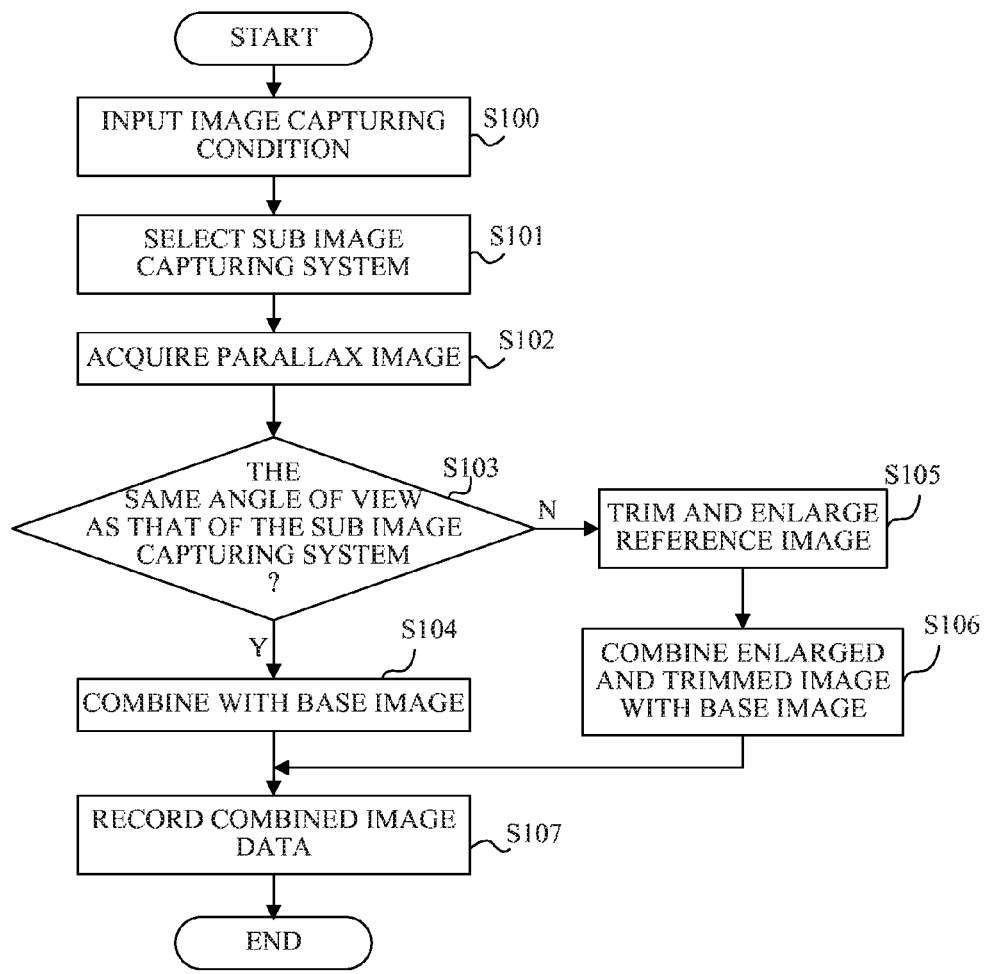
FIG. 8 is a flowchart of an image capturing/image synthesizing combination process to the first embodiment.

Since the procedure from S200 to S202 is the same as that from S100 to S102 in the image capturing and parallax image generation processing in FIG. 8, a description thereof will be omitted. Since the procedure of S203 and S204 is the same as that of S103 and S105 in the trimming and enlargement processes in FIG. 8, a description thereof will be omitted.

The system controller 17 moves to S205 from S203 or S204, and makes the reference image selector 20 select the main image as the base image used for an object distance calculation. Moreover, the system controller 17 makes the corresponding point extractor 21 extract the corresponding points between the base image and the reference image as the sub image or the enlarged image. The corresponding points are pixels at the same positions in the object image parts when the base image and the reference image as the two parallax images contain the same objects. Since the corresponding point extraction method can use the method described for the image combination process, a description thereof will be omitted.

Next, in S206, the system controller 17 makes the parallax amount calculator 22 calculates a parallax amount for each corresponding point extracted in S205. The parallax amount is calculated as a difference at the pixel position between each pixel (base pixel) of the base image obtained by the block matching method and the pixel (corresponding pixel) on the reference image corresponding to the base pixel.

Next, in S207, the system controller 17 makes the distance information calculator 19 calculate the object distance for each object contained in the main image. The distance information calculator 19 calculates a distance to each object using the expression (13), a parallax amount calculated in S206, a focal length of the main optical system 100 as known information, and base length information of the sub optical systems 110a and 110b.

Next, in S208, the system controller 17 records information of the object distance calculated in S207 together with parallax image data obtained in S202, in the image recording medium 16, and ends the procedure.

While this embodiment describes the calculation of the object distance using the first sub optical system 110, the object distance using the second sub optical system 120 can be calculated with a similar procedure.

A description will now be given of an advantage of calculating an object distance using the second sub optical system 120 having a middle focal length between the wide-angle end and the telephoto end of the main optical system 100. When the focal length of the main optical system 100 is set to 150 mm by the information inputter 14 in S200 in FIG. 10, the second sub image capturing system having the second sub optical system 120 is selected in S201 which has the same angle of view (the same focal length) as that of the main optical system 100. In S201, the first sub image capturing system having an angle of view wider than that of the main image capturing system may be selected, but the second sub image capturing system is selected which has an image capturing angle of view close to that of the main image capturing system and equal to or wider than that of the main image capturing system due to the following disadvantage.

Figure 10:
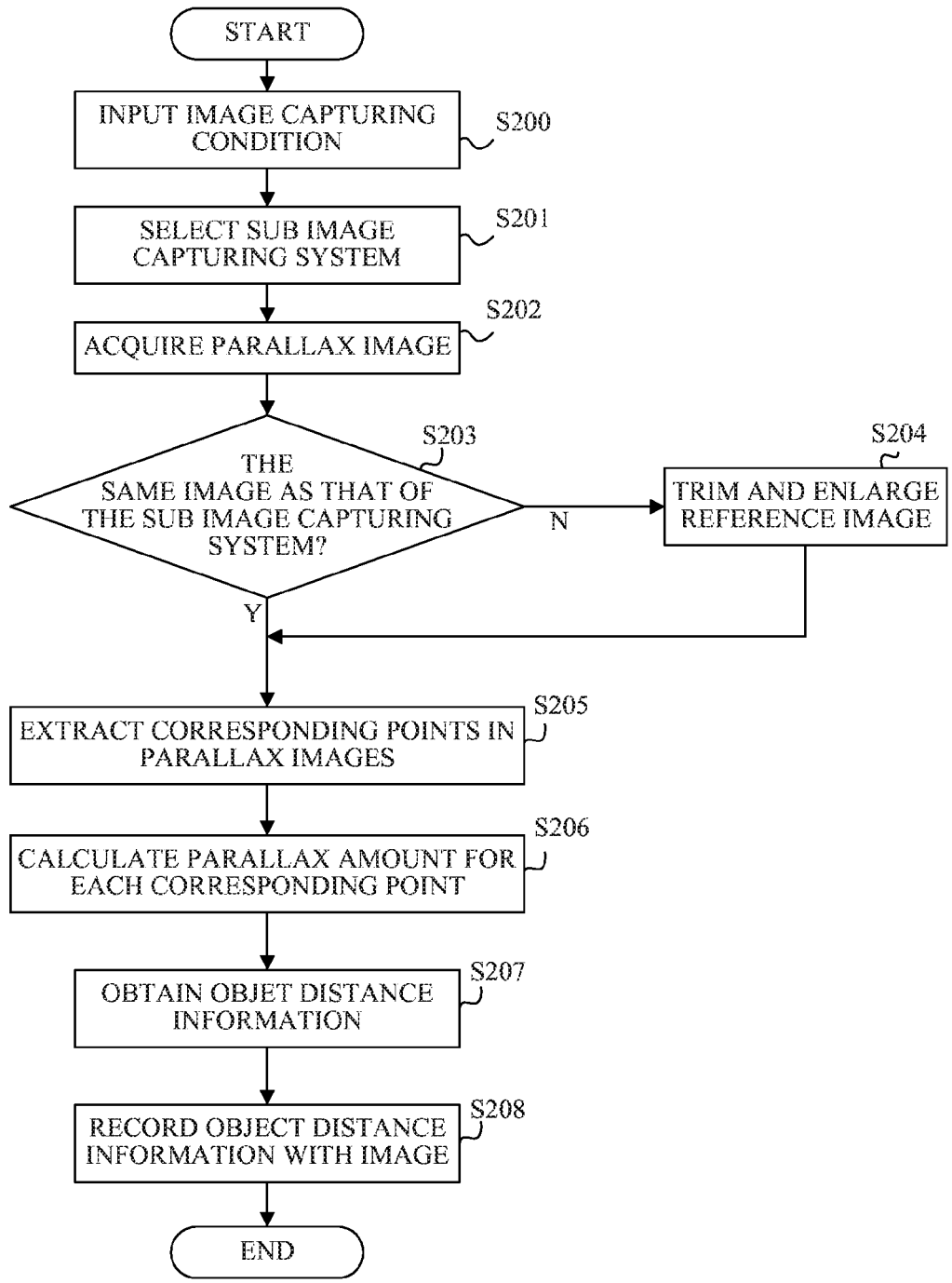
FIG. 10 is a flowchart of an object distance calculating process according to the first embodiment.

Since the image capturing angle of view of the second sub image capturing system is the same as that of the main image capturing system, the flow moves from S203 in FIG. 10 to the corresponding point extraction process (S205). Since it is unnecessary to trim and enlarge the object area in the sub image obtained by the second sub image capturing system, the resolution does not deteriorate and a better corresponding point extraction result in S205 and a better calculation result of the parallax amount can be obtained in S206.

If the first sub image capturing system is selected, the object size in the sub image obtained by the first sub image capturing system is significantly different from that of the main image, and the at least sextuple enlargement process is necessary for the object area in the sub image. Thus, the resolution of the enlarged image significantly lowers, and the corresponding point extraction and the parallax amount calculation are likely to contain serious errors in S205 and S206. As a result, the object distance is erroneously calculated and the AF precision may disadvantageously deteriorate.

In other words, the object distance can be precisely calculated in the overall range in the image capturing angle of view of the main image capturing system by using the sub image capturing system having an image capturing angle of view equal to or wider than the middle image capturing angle of view between the wide-angle end and the telephoto end of the main image capturing system, as in this embodiment.

While this embodiment discusses the object distance information acquired using the main image as the base image obtained by the main image capturing system and the sub image obtained by the second sub image capturing system. However, even with the sub image obtained by the first and second sub image capturing image systems, the object distance information can be acquired in the angle of view that can be commonly captured between the first and second sub image systems. Since a long base length can be secured between the first and second sub image capturing systems, the precision of the object distance information can be improved when a long distance object is captured.

In this embodiment, the inter-axis distance (base length) between the first sub optical system 110 and the main optical system 100 is different from that between the second sub optical system 120 and the main optical system 100. More specifically, the second sub optical system 120 is disposed near the main optical system 100, and the first sub optical system 110 is disposed distant from the main optical system 100.

A description will be given of an effect of the arrangement of the first and second sub optical systems 110 and 120 with such different inter-axis distances. It is understood based on the expressions (12) and (13) that when the object distance is the same, a shift amount of the object between a pair of parallax images is determined by the focal length and the base length of the optical systems in the image capturing system with which the pair of parallax images are obtained. In other words, in capturing the object with the same base length and the same object distance, an object shift amount reduces in the sub image obtained by the first sub image capturing system with a short focal length or a wide angle of view. When a shift amount of the object is small, it may be difficult to detect the shift amount. Therefore, the shift amount of the object is increased in the sub image obtained by the first sub image capturing system by placing the first sub optical system 110 having a wide angle of view more distant from the main optical system 100 than the second sub optical system 120. As a result, even when the object is captured while the main image capturing system is set to the wide-angle end, the calculation precision of the object distance can be made high.

As discussed, this embodiment arranges the first and second sub image capturing systems so as to satisfy the conditions of the expressions (1) and (2), thereby making small the image capturing apparatus 1 and providing precise object distance information in a wide object distance range. In addition, since the second sub image capturing system has an image capturing angle of view between the wide-angle end and the telephoto end of the main image capturing system, the object distance information can be precisely obtained in the entire image capturing angle of view of the main image capturing system.

Moreover, a variety of image capturing modes can be implemented using the configuration according to this embodiment. For example, in a high dynamic range mode, an image is captured by setting a different exposure condition between the first and second sub image capturing systems, and a plurality of obtained sub images are combined with the main image obtained by the main image capturing system. Thereby, a combined image with a wide dynamic range is obtained. In addition, in a blur addition mode, a blur is added to the background based on the calculated object distance as described above and an image having a highlighted main object can be obtained. In a three-dimensional image capturing mode, left and right parallax images are obtained in the main and sub image capturing systems arranged in the horizontal direction, and a stereoscopic image can be generated using one parallax image having a narrow angle of view and the other parallax image having a wide angle of view.

In this embodiment, the first and second sub optical systems are fixed focal length optical systems, but each of them may be an optical system that can vary a magnification.

While this embodiment discusses the lens integrated type image capturing apparatus in which the lens barrel 200 is integrated with the body 1*a*, the present invention is applicable to a lens interchangeable type image capturing apparatus in which a lens barrel as an interchangeable lens can be attached to and detached from the body of the image capturing apparatus. This can be applied to the following other embodiments.

Second Embodiment

Figure 11:
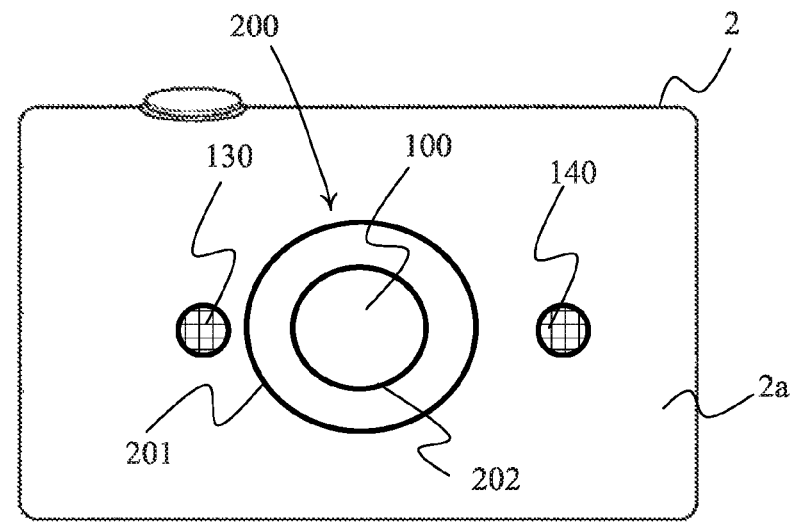
FIG. 11 is a front view of an image capturing apparatus according to a second embodiment of the present invention.

Referring now to FIG. 11, a description will be given of an image capturing apparatus 2 according to a second embodiment of the present invention. FIG. 11 illustrates the image capturing apparatus 2 according to this embodiment viewed from the object side.

A two-stage retractable lens barrel 200 is retractable and extendable relative to a body (housing) 2*a* of the image capturing apparatus 2, configured to hold the main object 100, and provided at the center of a front surface of the body 2*a*. A first sub optical system 130 and a second sub optical system 140 are arranged on the front surface of the body 2*a* in the horizontal direction at both sides of the lens barrel 200. The main optical system 100 and corresponding unillustrated main image sensor are the same as those of the first embodiment. The main optical system 100 and the main image sensor constitute the main image capturing system.

The retracted lens barrel 200 includes, in order from the body side (front side), a first barrel segment 201 and a second barrel segment 202, similar to the lens barrel 200 of the first embodiment. An outer diameter of the second barrel segment 202 is smaller than that of the first barrel segment 201.

Each of the first and second sub optical systems 130 and 140 is a (fixed focal length) imaging optical system having a fixed focal length. Two unillustrated sub image sensors have rectangular image capturing regions corresponding to the first and second sub optical systems 130 and 140, and capture or photoelectrically convert object images formed by each of the first and second sub optical systems 130 and 140. The sub image sensor is the same as that in the first embodiment. The first sub optical system 130 and the corresponding sub image sensor constitute the first sub image capturing system, and the second sub optical system 140 and the corresponding sub image sensor constitute the second sub image capturing system.

The main optical system 100 and the first and second sub optical systems 130 and 140 are arranged so that their optical axes are parallel to one another. The first sub optical system 130 is a fixed focal length optical system having the same focal length (or the same angle of view) as that of 24 mm at the wide-angle end of the main optical system 100 in the 35 mm conversion. On the other hand, the second sub optical system 140 is a fixed focal length optical system having a focal length at a middle zoom position between the wide-angle end and the telephoto end of the main optical system 100 (or an angle of view narrower than that at the wide-angle end and wider than that at the telephoto end). In one example, the second sub optical system 120 has a focal length of 100 mm in the 35 mm conversion.

Figure 12:
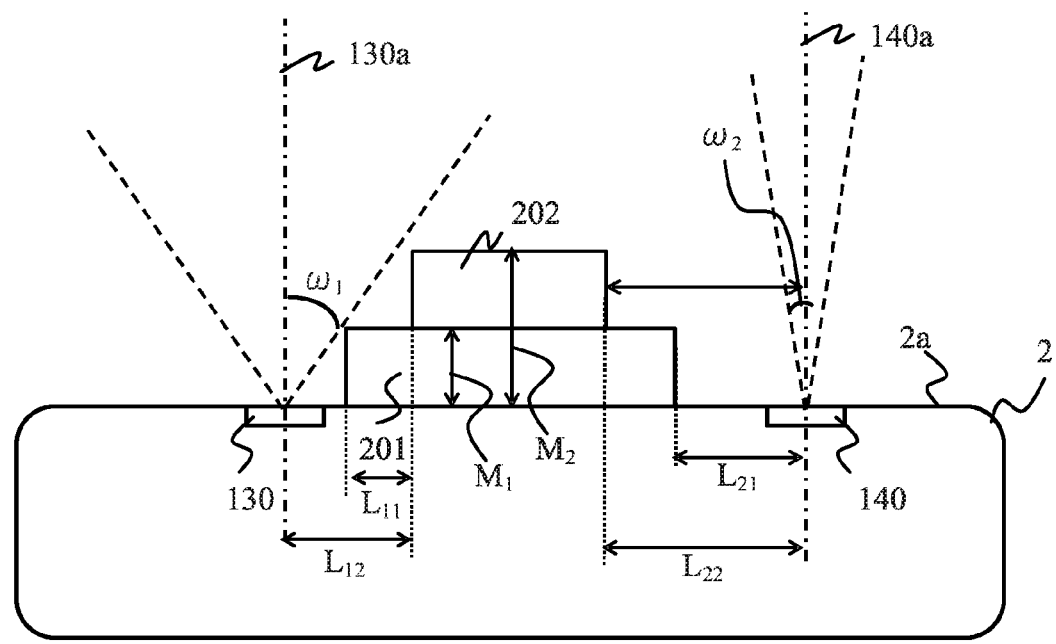
FIG. 12 is a view for explaining a relationship between the conditional expression (1) and the second embodiment.
Figure 13:
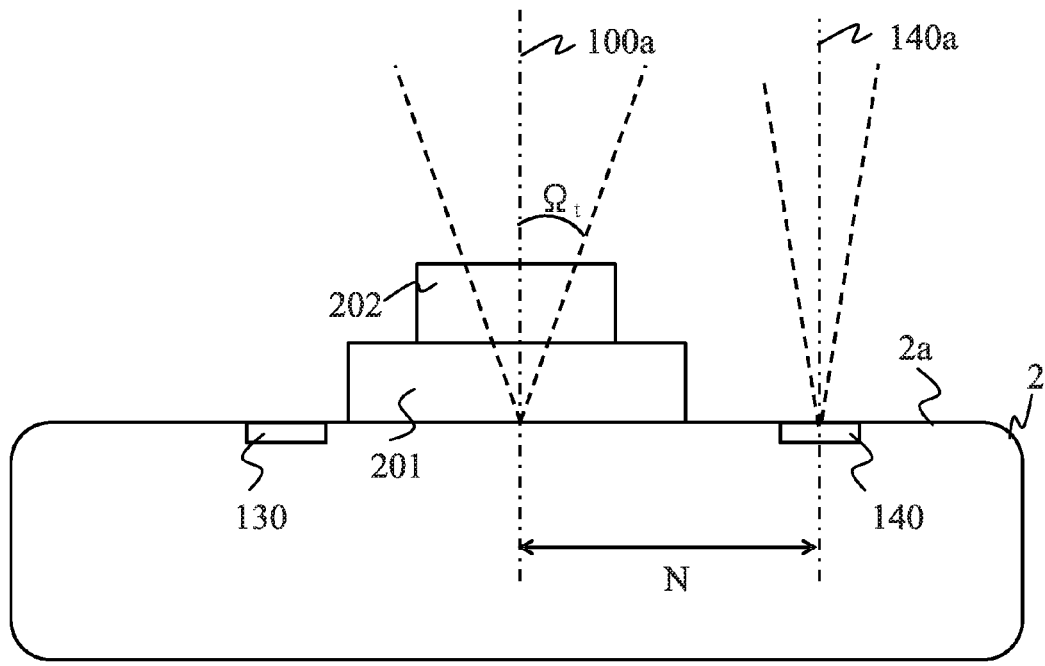
FIG. 13 is a view for explaining a relationship between the conditional expression (2) and the second embodiment.

Referring now to FIGS. 12 and 13, a description will be given of the relationship between the configuration of the image capturing apparatus 2 according to this embodiment and the conditions of the conditional expressions (1) and (2). FIG. 12 illustrates definitions relating to the condition of the conditional expression (1). Illustrated $M_1$ is an extension amount of the front end surface of the first barrel segment 201 on the basis of the front end lens surfaces in the first and second sub optical systems 130 and 140. In this embodiment, $M_1$=10 mm. $M_2$ is an extension amount of the front end surface of the second barrel segment 202 on the basis of the front end lens surfaces of the first and second sub optical systems 130 and 140. In this embodiment, $M_2$=20 mm.

$L_{11}$ is a distance in the horizontal direction (first inter-axis direction) between an optical axis 130*a* of the first sub optical system 130 and the outer circumferential surface of the first barrel segment 201. In this embodiment, $L_{11}$=7.79 mm. $L_{12}$ is a distance in the horizontal direction between the optical axis 130*a* of the first sub optical system 130 and the outer circumferential surface of the second barrel segment 202. In this embodiment, $L_{12}$=16.0 mm. $L_{21}$ is a distance in the horizontal direction (second inter-axis direction) between an optical axis 140a of the second sub optical system 140 and the outer circumferential surface of the first barrel segment 201. In this embodiment, $L_{21}$=17.0 mm. $L_{22}$ is a distance in the horizontal direction between the optical axis 140a of the second sub optical system 140 and the outer circumferential surface of the second barrel segment 202. In this embodiment, $L_{22}$=22.5 mm.

$\omega_1$ is a half angle of view of the first sub optical system 130 in the horizontal direction (or first inter-axis direction). More specifically, $\omega_1$ is a half value of an angle of view determined by a length of a long side of the rectangular image capturing region of the sub image sensor corresponding to the first sub optical system 130. In this embodiment, $\omega_1$=35.8°. $\omega_2$ is a half angle of view of the second sub optical system 140 in the horizontal direction (or second inter-axis direction). More specifically, $\omega_2$ is a half value of an angle of view determined by a length of a long side of the rectangular image capturing region of the sub image sensor corresponding to the second sub optical system 140. In this embodiment, $\omega_2$=9.8°.

FIG. 13 illustrates definitions relating to the condition of the conditional expression (2). Illustrated $\Omega_t$ is a half angle of view of the main optical system 100 at the telephoto end in the horizontal direction (second inter-axis direction). In this embodiment, $\Omega_t$=4.12°. A focal length of the main optical system 100 at the telephoto end is $f_t$=53.7 mm. N is an inter-axis distance between the main optical system 100 and the second sub optical system 140 or a distance between the optical axes 100a and 140a. In this embodiment, N=28.6 mm.

Table 1 summarizes the above values of this embodiment. Table 2 summarizes the values of the conditional expressions (1) and (2) in this embodiment. As understood from Table 2, this embodiment satisfies the conditions of the conditional expressions (1) and (2). When the conditions of the conditional expressions (1) and (2) are satisfied, the image capturing apparatus 2 can be made small and the object distance information can be precisely obtained in a wide object distance range.

Third Embodiment

Figure 14:
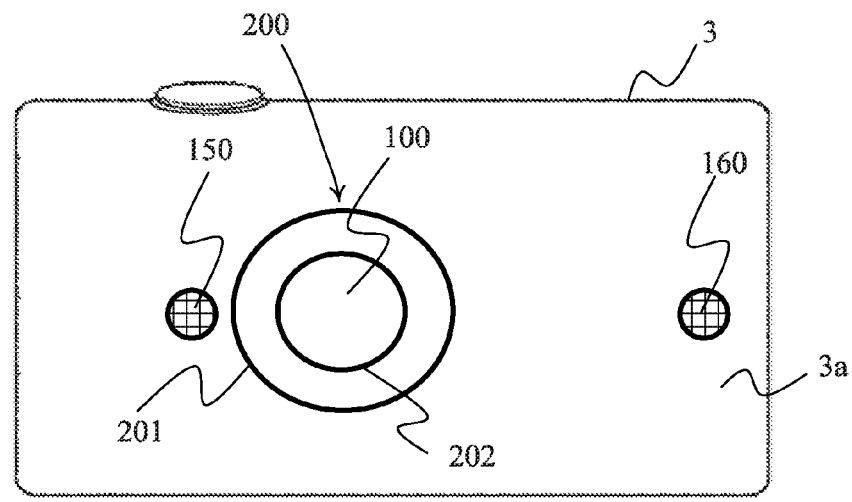
FIG. 14 is a front view of an image capturing apparatus according to a third embodiment of the present invention.

Referring now to FIG. 14, a description will be given of an image capturing apparatus 3 according to a third embodiment of the present invention. FIG. 14 illustrates the image capturing apparatus 3 according to this embodiment viewed from the object side.

A two-stage retractable lens barrel 200 is retractable and extendable relative to a body (housing) 3a of the image capturing apparatus 3, configured to hold the main object 100, and provided at the center of a front surface of the body 3a. A first sub optical system 150 and a second sub optical system 160 are arranged on the front surface of the body 3a in the horizontal direction at both sides of the lens barrel 200. The main optical system 100 and corresponding unillustrated main image sensor are the same as those of the first embodiment. The main optical system 100 and the main image sensor constitute the main image capturing system.

The retracted lens barrel 200 includes, in order from the body side (front side), a first barrel segment 201 and a second barrel segment 202, similar to the lens barrel 200 of the first embodiment. The outer diameter of the second barrel segment 202 is smaller than that of the first barrel segment 201.

Each of the first and second sub optical systems 150 and 160 is a (fixed focal length) imaging optical system having a fixed focal length. Two unillustrated sub image sensors have rectangular image capturing regions corresponding to the first and second sub optical systems 150 and 160, and capture or photoelectrically convert the object images formed by each of the first and second sub optical systems 150 and 160. The sub image sensor is the same as that in the first embodiment. The first sub optical system 150 and the corresponding sub image sensor constitute the first sub image capturing system, and the second sub optical system 160 and the corresponding sub image sensor constitute the second sub image capturing system.

The main optical system 100 and the first and second sub optical systems 150 and 160 are arranged so that their optical axes are parallel to one another. The first sub optical system 150 is a fixed focal length optical system having the same focal length (or the same angle of view) as that of 24 mm at the wide-angle end of the main optical system 100 in the 35 mm conversion. On the other hand, the second sub optical system 160 is a fixed focal length optical system having a focal length at a middle zoom position between the wide-angle end and the telephoto end of the main optical system 100 (or an angle of view narrower than that at the wide-angle end and wider than that at the telephoto end). In one example, the second sub optical system 160 has a focal length of 100 mm in the 35 mm conversion.

Figure 15:
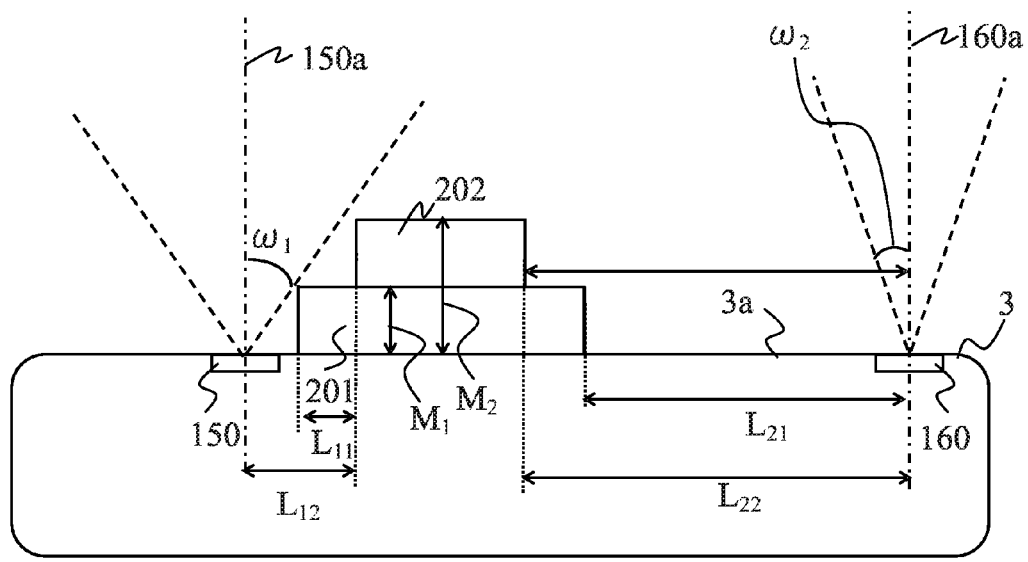
FIG. 15 is a view for explaining a relationship between the conditional expression (1) and the third embodiment.
Figure 16:
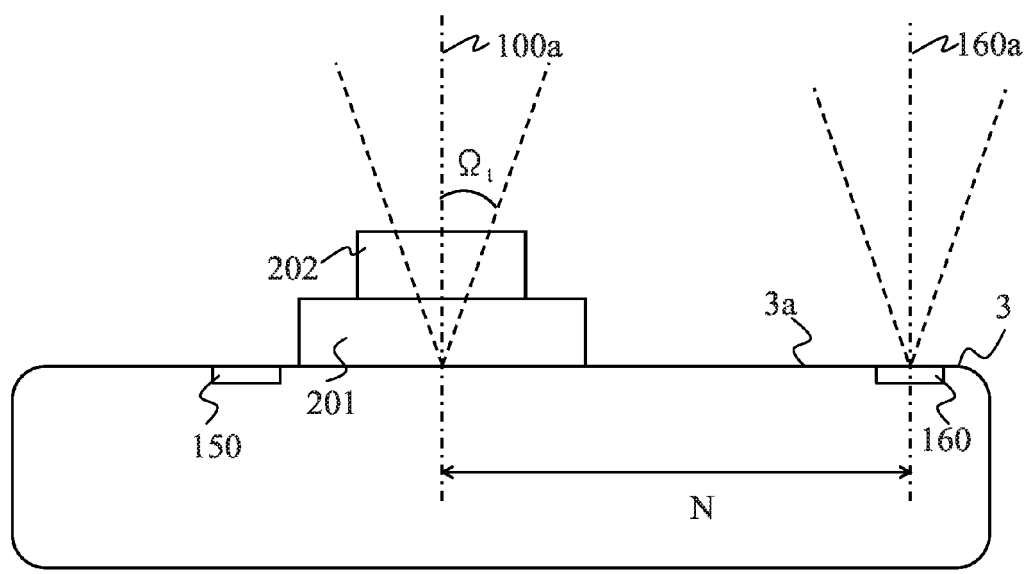
FIG. 16 is a view for explaining a relationship between the conditional expression (2) and the third embodiment.

Referring now to FIGS. 15 and 16, a description will be given of the relationship between the configuration of the image capturing apparatus 3 according to this embodiment and the conditions of the conditional expressions (1) and (2). FIG. 15 illustrates definitions relating to the condition of the conditional expression (1). Illustrated $M_1$ is an extension amount of the front end surface of the first barrel segment 201 on the basis of the front end lens surfaces in the first and second sub optical systems 150 and 160. In this embodiment, $M_1$=10 mm. $M_2$ is an extension amount of the front end surface of the second barrel segment 202 on the basis of the front end lens surfaces of the first and second sub optical systems 150 and 160. In this embodiment, $M_2$=20 mm.

$L_{11}$ is a distance in the horizontal direction (first inter-axis direction) between an optical axis 150a of the first sub optical system 150 and the outer circumferential surface of the first barrel segment 201. In this embodiment, $L_{11}$=7.79 mm. $L_{12}$ is a distance in the horizontal direction between the optical axis 150a of the first sub optical system 150 and the outer circumferential surface of the second barrel segment 202. In this embodiment, $L_{12}$=16.0 mm. $L_{21}$ is a distance in the horizontal direction (second inter-axis direction) between an optical axis 160a of the second sub optical system 160 and the outer circumferential surface of the first barrel segment 201. In this embodiment, $L_{21}$=48.0 mm. $L_{22}$ is a distance in the horizontal direction between the optical axis 160a of the second sub optical system 160 and the outer circumferential surface of the second barrel segment 202. In this embodiment, $L_{22}$=57.1 mm.

$\omega_1$ is a half angle of view of the first sub optical system 150 in the horizontal direction (or first inter-axis direction). More specifically, $\omega_1$ is a half value of an angle of view determined by a length of a long side of the rectangular image capturing region of the sub image sensor corresponding to the first sub optical system 150. In this embodiment, $\omega_1$=35.8°. $\omega_2$ is a half angle of view of the second sub optical system 160 in the horizontal direction (or second inter-axis direction). More specifically, $\omega_2$ is a half value of an angle of view determined by a length of a long side of the rectangular image capturing region of the sub image sensor corresponding to the second sub optical system 160. In this embodiment, $\omega_2=19.1°$.

FIG. 16 illustrates definitions relating to the condition of the conditional expression (2). Illustrated $\Omega_t$ is a half angle of view of the main optical system 100 at the telephoto end in the horizontal direction (second inter-axis direction). In this embodiment, $\Omega_t=4.12°$. A focal length of the main optical system 100 at the telephoto end is $f_t=53.7$ mm. N is an inter-axis distance between the main optical system 100 and the second sub optical system 160 or a distance between the optical axes 100a and 160a. In this embodiment, N=70.0 mm.

Table 1 summarizes the above values of this embodiment. Table 2 summarizes the values of the conditional expressions (1) and (2) in this embodiment. As understood from Table 2, this embodiment satisfies the conditions of the conditional expressions (1) and (2). When the conditions of the conditional expressions (1) and (2) are satisfied, the image capturing apparatus 3 can be made small and the object distance information can be precisely obtained in a wide object distance range.

TABLE 1

| | $\Omega t$ | ft | M1 | M2 | N | $\omega 1$ | $\omega 2$ | L11 | L12 | L21 | L22 |
|---|---|---|---|---|---|---|---|---|---|---|---|
| First Embodiment | 4.12 | 53.7 | 10 | 20 | 28.6 | 35.8 | 6.6 | 22.7 | 31.2 | 7.8 | 16.9 |
| Second Embodiment | 4.12 | 53.7 | 10 | 20 | 37.7 | 35.8 | 9.8 | 7.79 | 16 | 17 | 25.5 |
| Third Embodiment | 4.12 | 53.7 | 10 | 20 | 70 | 35.8 | 19.1 | 7.79 | 16 | 48 | 57.1 |

TABLE 2

| | Conditional expression | | | | |
|---|---|---|---|---|---|
| | 1 | | | | |
| | First sub image capturing system and First lens barrel | First sub image capturing system and Second lens barrel | Second sub image capturing system and First lens barrel | Second sub image capturing system and Second lens barrel | 2 |
| First Embodiment | 3.15 | 2.16 | 6.74 | 7.30 | 7.39 |
| Second Embodiment | 1.08 | 1.11 | 9.84 | 7.38 | 9.75 |
| Third Embodiment | 1.08 | 1.11 | 13.86 | 8.24 | 18.10 |

Image sensors (such as the main image sensor and two sub image sensors) are separately provided to the main image capturing system, and the first and second sub image capturing systems in each embodiment. However, a single image sensor may include a main image capturing region used for the main image capturing system and two sub image capturing regions used for the first and second image capturing systems.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention can provide a small image capturing apparatus that includes a main image capturing system having a high zoom ratio and enables object distance information to be precisely acquired in a wide object distance range using the main image capturing system and a sub image capturing system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-147699, filed Jul. 27, 2015, which is hereby incorporated by reference herein in its entirety.

What is claimed is:

1. An image capturing apparatus comprising:
a main image capturing system configured to capture an object image formed by a main optical system that can vary a magnification;
a first sub capturing system configured to capture an object image formed by a first sub optical system having an angle of view equal to or wider than that at a wide-angle end of the main optical system; and
a second sub capturing system configured to capture an object image formed by a second sub optical system having an angle of view narrower than that at the wide-angle end of the main optical system and equal to or wider than that at a telephoto end of the main optical system, wherein an optical barrel configured to hold the main optical system is retractable relative to a body of the image capturing apparatus, and the first sub optical system and the second sub optical system are provided to the body, wherein where an i-th denotes first or second, and an i-th inter-axis direction is a direction in which an optical axis of the main optical system is separated from one of an optical axis of the first sub optical system and an optical axis of the second sub optical system, and wherein $$20 \geq \frac{L_{ij}}{M_j \tan \omega_i} \geq 1$$

$$30 \geq \frac{N}{f_t \tan \Omega_t}$$

are satisfied, where $\Omega_t$ is a half angle of view in a second inter-axis direction at the telephoto end of the main optical system, $f_t$ is a focal length at the telephoto end of the main optical system, N is an inter-axis distance between the main optical system and the second sub optical system, and $\omega_i$ is a half angle of view in the i-th inter-axis direction of the i-th sub optical system among the first sub optical system and the second sub optical system, $L_{ij}$ is a distance in the i-th inter-axis direction between the optical axis of the i-th sub optical system and an outer circumferential surface of a j-th barrel segment, where j denotes an order of a barrel segment of the optical barrel counted from the body side in the optical barrel, and $M_j$ is an extension amount of the j-th barrel segment relative to an optical surface closest to an object side in the first sub optical system and the second sub optical system.

2. The image capturing apparatus according to claim 1, wherein each of the first sub optical system and the second sub optical system is a fixed focal length optical system.

3. The image capturing apparatus according to claim 1, further comprising:
a main image sensor configured to photoelectrically convert the object image in the main image capturing system; and
a sub image sensor configured to photoelectrically convert the object image in each of the first sub image capturing system and the second sub image capturing system,
wherein an image capturing region of the sub image sensor is narrower than that of the main image sensor.

4. The image capturing apparatus according to claim 1, wherein an inter-axis distance between the first sub optical system and the main optical system is different from that between the second sub optical system and the main optical system.

5. The image capturing apparatus according to claim 1, further comprising at least one processor or circuit configured to:
acquire object distance information in an image capturing angle of view of the main image capturing system using a main image generated by the main image capturing system and a sub image generated by each of the first sub image capturing system and the second sub image capturing system.

6. The image capturing apparatus according to claim 5, wherein the at least one processor or circuit is further configured to perform a selecting processing that selects a sub image capturing system used to acquire the object distance information from among the first sub image capturing system and the second sub image capturing system, based on an angle of view set in the main optical system.

7. The image capturing apparatus according to claim 6, wherein the at least one processor or circuit is further configured to acquire, when an image capturing angle of view of the main image capturing system is different from that of the selected sub image capturing system selected in the selecting processing, the object distance information using an enlarged image that is obtained by trimming and enlarging an image area in a sub image generated by the selected sub image capturing system, which corresponds to the image capturing angle of view of the main image capturing system.

8. The image capturing apparatus according to claim 1, wherein the at least one processor or circuit is further configured to perform an image combining processing that combines a main image generated by the main image capturing system with sub images generated by the first sub image capturing system and the second sub image capturing system, and generates a combined image.

* * * * *